UNITED STATES PATENT OFFICE.

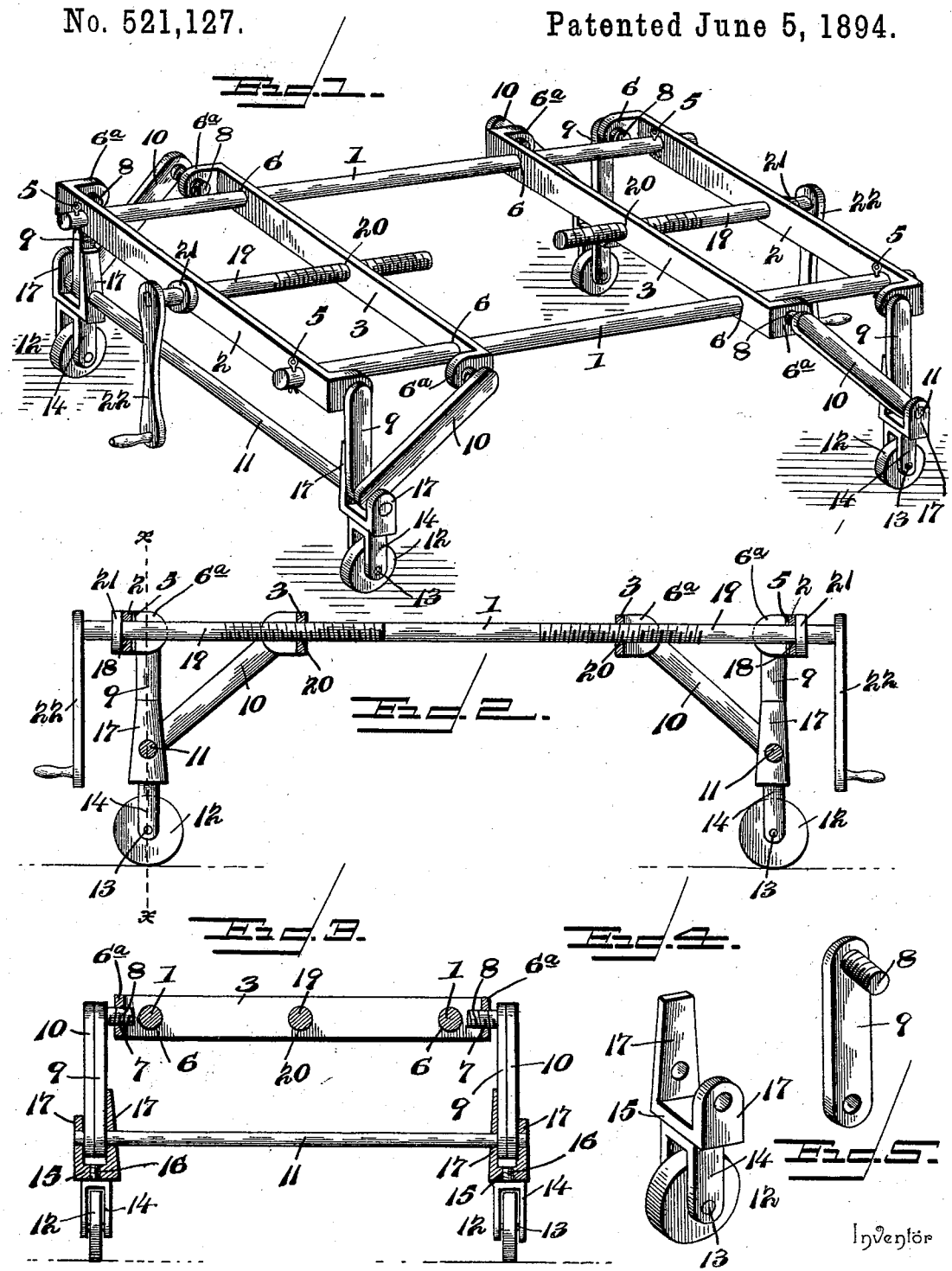

HARRY M. PUTT, OF HUNTINGDON, PENNSYLVANIA, ASSIGNOR OF ONE-HALF TO W. M. BENSON, OF SAME PLACE.

STOVE-TRUCK.

SPECIFICATION forming part of Letters Patent No. 521,127, dated June 5, 1894.

Application filed March 15, 1894. Serial No. 503,757. (No model.)

*To all whom it may concern:*

Be it known that I, HARRY M. PUTT, a citizen of the United States, residing at Huntingdon, in the county of Huntingdon and State of Pennsylvania, have invented a new and useful Stove-Truck, of which the following is a specification.

My invention relates to an improvement in those stove trucks which are adapted to operate as a combined lifting jack and vehicle, whereby the stove may be first raised and subsequently carried to the desired place; and the invention consists of certain improvements in the construction of the supporting legs or rods, whereby they more effectually perform their two-fold function of raising and carrying the stove.

In the accompanying drawings:—Figure 1 represents a perspective view of an appliance constructed after the manner of my invention. Fig. 2 is a longitudinal section. Fig. 3 is a cross section on line x—x of Fig. 2. Fig. 4 is an enlarged detail view of one of the casters and the means for connecting them to the truck. Fig. 5 is a similar view of the means for connecting the swinging and supporting rods to the frame of the machine.

The frame of my device consists of the two longitudinal bars or rods 1, upon which the cross rods 2 and 3 are arranged. The rods 1, are formed of round iron, and have the rods 2 fixed to each end thereof by means of the pins 5, passing through the bars on each side of the rods, while the rods 3, are arranged to be capable of movement on the bars 1, by means of the enlarged openings 6, formed therein. The rods 2 and 3 are four in number and arranged in two pairs, and the ends of each rod are formed with the studs 6ª, which bend horizontally toward the rod which completes the pair of which the rod having the stud is a member. Each of these studs is formed with the internally threaded openings 7 in which the threaded arms 8 are arranged, and the arms 8 are in turn rigidly secured to or formed integral with the rods 9 and 10 respectively. Rods 9 and 10 are the supporting rods and are one for each end of the rods 2 and 3, the rods 9 being connected to the studs of rods 2, while the rods 10 are connected to rods 3. The length of rods 9 is less than that of their companions, 10, and both are secured at their lower ends to the transversely extending shafts 11, which are two in number and arranged one for each pair of rods 2 and 3 and by which the two rods 9 and 10 of each pair of rods 2 and 3 are pivotally connected at their lower ends by a common pivot.

12 indicates the casters, which are one for each end of the shafts 11 and which are mounted upon the pins 13 of the frames 14, and the frames are in their turn, pivotally connected to the yokes 15 by means of the vertical spindle 16. The spindle 16, is revolubly arranged in the lower portion of the respective yokes 15, while the yokes are provided with the arms 17, embracing the shafts 11 on each side of the rods 9 and 10, and operating to hold said rods in their place on the shafts. The inner of the arms 17 are longer than their companions and project up above shafts 11, and parallel with the rods 9, to which they are respectively secured by bolting or riveting as may be preferred.

Formed in the center of the rods 2, and extending transversely therethrough are the openings 18, in which the shafts 19 are located so as to be capable of free movement, longitudinally and revolubly, therein. The shafts 19, are two in number one for each of the rods 2, and extend inwardly from said rods to the rods 3, with which they are engaged by means of the internally threaded openings 20, the shafts being correspondingly threaded so as to properly engage therewith. Located on the shafts 19, just beyond the rods 2, are the collars 21, which are rigidly fixed to their respective shafts, and operate to prevent inward movement of the same. Thus by revolving the shafts 19 the rods 3 may be moved toward or from the rods 2 as desired, since the weight on the bars 1 will tend to spread the rods 2 and 3, and thus bind collars 21, against their respective rods, so that they can be spread only by turning shafts 19 to allow the desired movement. This turning of shafts 19 may be effected by the cranks 22, which are fixed to the ends of the shafts, as shown. It will be seen that the rods 9 and 10 of each pair of rods 2 and 3 slant downwardly and toward each other, so that the weight of the truck and its contents will tend to spread them away from each other. This movement is, as explained before, prevented by the shafts 19, which are connected to the rods 2 and 3 by means of the collar 21, and openings 20 respectively, and which may be allowed to spread or made to contract by turning the shafts 19 in the requisite direction, this being determined by the disposition of the threads thereon.

In using my improved truck the rods 2 and 3 are spread apart so that the bars 1, composing the frame of the truck, will lie as near the ground as possible, and the truck passed under the stove to be raised. When this has been accomplished the shafts 19 are operated to draw the rods 2 and 3 of each pair toward each other, consequently pushing the lower ends of rods 9, outward and causing them to assume a vertical position. This will, of course, result in a raising of the truck and, consequently the stove which it supports. It will now be possible to move the truck on casters 12, to any place desired, after which the shafts 19 may be operated to allow the rods 2 and 3 to spread, under the influence of the weight of the stove, which will lower the truck, and deposit the stove on the floor.

The truck may now be moved from under the stove, and the operation is complete. It will be understood, that the use of my invention is not limited to lifting and conveying stoves, but that it can be used for a variety of other purposes which will readily suggest themselves and do not, therefore, need description here. By means of the threaded arms of the rods 9 and 10 and the correspondingly threaded openings the said rods may be connected to the rods 2 and 3 so as to be capable of swinging thereon during the operation of the truck, and at the same time affords an easy and effective method of connecting the two parts.

Having thus described the invention, what is claimed, and desired to be secured by Letters Patent, is—

1. In a stove truck, the combination of two parallel bars, cross rods fixed to each end thereof and extending from one bar to another, a second rod for each of the fixed rods, and mounted on the parallel bars so as to be capable of movement toward and from the fixed rods, a threaded shaft connecting each of the fixed rods and the movable rod which operates therewith, a swinging rod connected to each end of the said fixed and movable rods, the swinging rods at each end of the rods composing each pair of fixed and movable rods being pivotally joined to each other at their lower ends, and casters connected to each of said joints whereby upon moving the shafts connected to the fixed and movable rods the said rods may be moved toward and from each other and the swinging rods spread or contracted so as to raise or lower the truck, substantially as described.

2. In a stove truck, the combination of a frame, two rods pivotally connected thereto and joined to each other at their lower ends, the upper end of one of said rods being capable of movement toward and from the remaining rod, and a screw-shaft connected to the two rods, whereby such movement is allowed and controlled and the truck consequently raised and lowered, substantially as described.

3. In a truck the combination of a frame, a cross-bar movable longitudinally thereon, a rod pivotally connected to each end of the cross bar, two rods similarly connected to the frame and one adjacent to each of the first rods, the ends of the adjacent rods being pivotally connected to each other, and a threaded shaft connected to the frame and to the cross bar, and whereby the cross bar may be made to move and the rods consequently spread or contracted, substantially as and for the purpose described.

4. In a truck the combination of a frame, a cross bar movable longitudinally thereon, a rod pivotally connected to each end of the cross bar, two rods similarly connected to the frame and one adjacent to each of the first rods, a shaft extending across the machine and operating to join the lower ends of each of the adjacent rods, a yoke for each pair of adjacent rods and having two arms connected to the shaft and arranged on each side the said adjacent rods whereby they are held from lateral displacement and a threaded shaft connected to the frame of the truck and to the cross bar, and whereby the rods may be spread or contracted, substantially as and for the purpose described.

In testimony that I claim the foregoing as my own I have hereto affixed my signature in the presence of two witnesses.

HARRY M. PUTT.

Witnesses:
 SAML. A. STEEL,
 G. I. GREEN.